United States Patent
Garcia, Jr. et al.

(10) Patent No.: US 6,654,037 B1
(45) Date of Patent: Nov. 25, 2003

(54) EMBEDDED WINDOWS IN BACKGROUND IMAGE

(75) Inventors: Octavio Garcia, Jr., Tigard, OR (US); Jerry Majdic, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/437,983

(22) Filed: Nov. 10, 1999

(51) Int. Cl.[7] .................................................. G09G 5/00
(52) U.S. Cl. ........................ 345/802; 345/788; 345/767
(58) Field of Search .................................. 345/802, 790, 345/797, 781, 782, 793–796, 799–801, 779, 838, 839, 848–852, 764–768

(56) References Cited

U.S. PATENT DOCUMENTS

| | | | | |
|---|---|---|---|---|
| 5,499,334 A | * | 3/1996 | Staab | 345/778 |
| 5,745,109 A | * | 4/1998 | Nakano et al. | 345/823 |
| 5,754,809 A | * | 5/1998 | Gandre | 345/782 |
| 5,880,733 A | * | 3/1999 | Horvitz et al. | 345/427 |
| 6,229,542 B1 | * | 5/2001 | Miller | 345/782 |

* cited by examiner

Primary Examiner—Sy D. Luu
(74) Attorney, Agent, or Firm—Marger Johnson & McCollom, PC

(57) ABSTRACT

A method for creating a graphical user interface. The method includes the steps of sizing and locating a process window, which is created by an application. The method creates a graphical representation of the process window and associates information with the process window. The process window is embedded into a background image, creating an embedded process window. Activity with regards to the process window is then monitored, where the activity will indicate that the embedded process window is to become an active window.

8 Claims, 2 Drawing Sheets

EMBEDDED WINDOWS IN BACKGROUND IMAGE

BACKGROUND OF THE INVENTION

1. Field of the Invention

This invention relates to graphical user interfaces, more particularly to one that utilizes background images.

2. Background of the Invention

Most computer users are very familiar with three aspects of the graphical user interfaces (GUI) in use today. They are windowing, icons and background images. These common aspects span all types of computer operating systems such as the Macintosh® operating systems, the various versions of Microsoft's Windows® operating system and Unix® operating systems. These are just intended as examples and are not meant to limit the application of the invention to these operating systems.

Windowing involves the presentation of several active processes that can be monitored by the user by looking at a window drawn for that specific process. Icons are typically used to represent dormant applications or files, either to avoid using a process window on the screen or to represent a shortcut to an inactive application. The background image is most easily exemplified by what is referred to as wallpaper. This is the image that resides on the screen behind all the windows and icons.

For purposes of this discussion, several terms will have to be specified. A window that has an associated application will be referred to as a process window. The executable program, such as a word processor, an e-mail reader, or a compiler, for example, will be referred to as an application. The particular files these applications operate upon, such as a specific document for the word processor or a software program being compiled, will be referred to as files. For example, an icon may be for an application, such as MS Word, or it may be for a particular document, such as mydocument.doc.

There has been a considerable amount of work in these areas. For example, U.S. Pat. No. 4,845,644, issued Jul. 4, 1989, is directed to the ability to have several processes running at once, with each process having its own window. A display manager handles interaction with the user, so the user's selection of a particular window brings that window to the front of the other windows, moving the unselected windows behind it. It still allows the user to see the other windows, so if the user needs to see the processes running in the other windows, they are still available as selections.

This can be further explained with reference to prior art FIG. 1. The user's screen 10 can have several windows 12a–12f. The windows may cascade, as is the case of windows 12b, 12c and 12d, where one window is partially in front of the others. The windows may be positioned side by side, as is the case with windows 12a and 12c. However, a problem can occur if one window is sized and positioned by the user and then another window is brought to the front. This can be seen by windows 12d and 12e, which has become completely covered by the larger window.

Several solutions have been proposed for this problem. U.S. Pat. Nos. 5,522,025, issued May 28, 1996, and U.S. Pat. No. 5,859,639, issued Jan. 12, 1999 exemplify some of these solutions. The '025 patent has a solution wherein the applications redraw their own windows as necessary. The '639 patent actually applies to both windows and icons, wherein these items uncover themselves when they become hidden or buried.

Another problem with the process windows occurs due to the increasing power of processors. As processors become more powerful, they can run more and more processes simultaneously. This results in several process windows being present on the user's screen. The display becomes cluttered and unpleasant for the user.

One solution for this is to reduce the processes to a task bar item, typically located on a bar running horizontally across the display, or to an icon. Both of these have very similar properties, such as not being able to see what is occurring in these processes without some special user selection being made. For example, in the Windows® environment, an e-mail reader can have a flag set by the user that makes the button on the bottom of the screen blink when a new e-mail message comes in. However, there is no way to see what the message is about or from whom without activating the e-mail reader into yet another process window.

Similarly, icons typically do not have any information associated with them except for the name of the application or the file. For some 'shortcut' icons that identify the particular file, the icon represents the application and a text tag identifies the file. One solution to this minimal information has been suggested in U.S. Pat. No. 5,742,779, issued Apr. 21, 1998. In this example, the icons are used to convey more information when the cursor is hovered over the icon, or the icon is otherwise activated. However, this solution does not overcome the problems of having to activate the icon to acquire more information.

One are a in which icons have become very useful is in embedding objects within other objects. For example, when a document is e-mailed to a recipient, it is very convenient to embed an iconic representation into the e-mail. It allows the recipient to see both the application that created the document and the document name itself. Such a process is discussed in U.S. Pat. No. 5,761,686, issued Jun. 2, 1998.

Other applications of embedding icons and images into other images exist, such as the one discussed in U.S. Pat. No. 5,659,726, issued Aug. 19, 1997. This patent discusses the ability to embed external data into such things as bitmaps, fax data and other data formats, without altering the original image. However, no mention is made of using this type of embedding to solve the problems discussed above of too many processes windows or limited information conveyed by icons.

Therefore, a method of creating a user interface that conveys useful information without overburdening the user with too much clutter on their screen.

SUMMARY OF THE INVENTION

One aspect of the invention is a method for creating a graphical user interface. The method includes the steps of sizing and locating an active process window for embedding into a background image. A graphical representation is created for the active process window and information relevant to the process window is associated with the graphical representation. The graphical representation is then embedded into a background image. Activity with regards to the embedded process window is then monitored. The embedded process window can become active upon user action, a triggering event, or both.

Alternatively, the monitoring of the activity may involve updating the embedded process window. The update may trigger off a particular event occurring in the underlying process, or may be a periodic update, or both. The embedded process window contains the actual information normally displayed in an active window, thereby giving the user more information and the ability to make priority decisions based upon the information.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
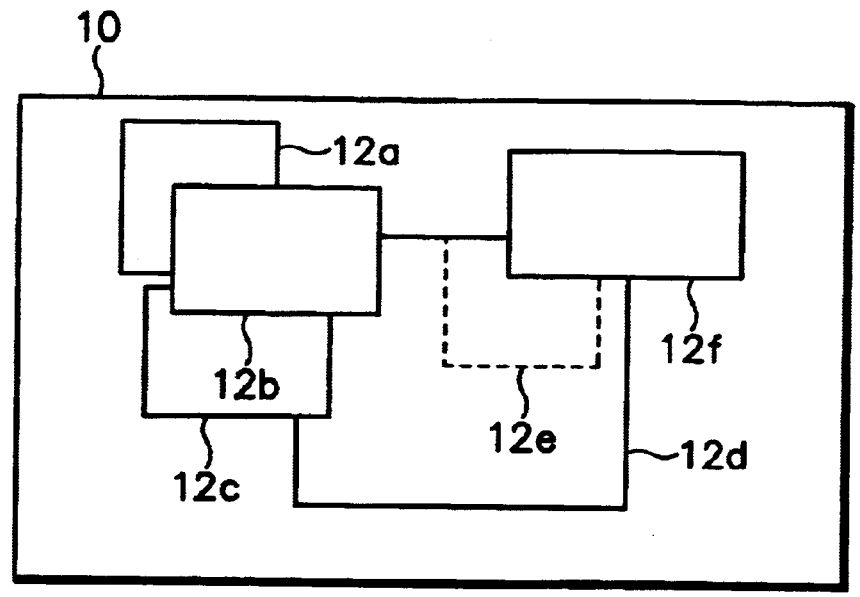
FIG. 1 shows a prior art implementation of process windows.

As discussed previously, FIG. 1 shows a prior art implementation of process windows, in which every active process is given its own window. The windows are cascaded, displayed side by side, or possibly even get hidden by other windows. In addition, the user's display becomes very cluttered and unpleasant to work with. For the reasons discussed earlier, reducing some of the process windows to buttons or icons is not particularly desirable.

Figure 2:
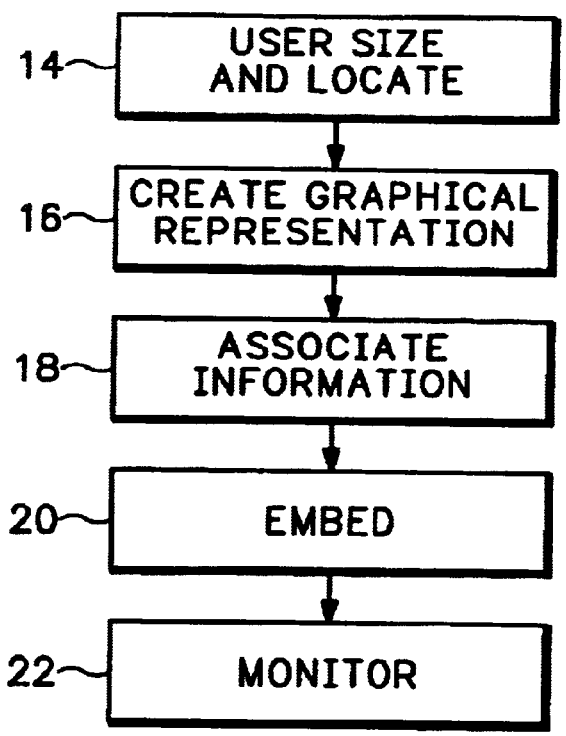
FIG. 2 shows a flowchart of a method for creating a graphical user interface, in accordance with the invention.

FIG. 2 shows one embodiment of a method for creating a user interface that solves these problems by embedding process windows into a background image. Using the display 10 shown in FIG. 1, merely as a starting point, the user would select one of the windows, such as window 12a for embedding. This selection occurs in step 14 of FIG. 2. The user designates the size and location of the window, typically by using their mouse or other device to pick up and move the window and increase or decrease the window size. Other possibilities for sizing and locating the window are of course possible and there is no intention to limit application of the invention by this example.

The sizing and location could have several other options as well. For example, the user could perform an initial setup for that process window, and designate that all processes run by that application take a certain position and size on the display. Alternatively, the user could designate the size and location for every process window every time. Further, the operating system could just have a preset default, either by the user or not, and would select a size and location before embedding the process window.

One aspect of the invention is that the user does not have to reactivate the window, the process for which will be discussed later, to resize it. The user will have the flexibility to override any defaults if the user so desires. In the current state of the art, the user has to select a window, bringing it to the front, prior to moving or resizing the window. In this invention, the user can resize or relocate the window without bringing it out to a process window.

Once the size and location of the process window for embedding is set, the operating system creates a graphical representation of the process window in step 16 of FIG. 2. The graphical representation could be in any format. However, the most common one is a bitmap. The wallpaper background image mentioned earlier is typically a bitmap. Again, other options are possible and there is no intention to limit application of the invention to this particular format.

In step 18, information related to the process window is associated with the graphical representation. This information can include the application running the process, the file being operated upon by the application, and the current status of the process. This information is typically already available to the operating system, but it not usually presented to the user in an icon or button format. For example, in the Windows® environment this information is available from the registry file.

A key aspect of the invention is that the entire process window is embedded. The window is not minimized down to a button on a toolbar, or an icon. It is the same information that would be displayed in an active window, just rendered into the background of the image. An advantage of this is that the user will not be able to inadvertently bring this window to the foreground, as in the multiple window example of prior art FIG. 1.

In step 20 of FIG. 2, the graphical representation and its associated information is embedded into the background image. Note that the background image may just be a solid color, such as black or other user-specified color. Additionally, it could be a pattern or a tiled image. The graphical representation is just integrated into the format of the background image. For example, if the background image is a bitmap and the graphical representation of the process window is a bitmap, the pixels for the process window position will just be changed to be the pixels from the graphical representation.

Once the graphical representation is embedded, the operating system monitors the process which created the original process window prior to embedding and/or the user's interaction with that portion of the display screen. Several alternatives exist for the monitoring step 22.

In one example, the operating system could monitor only the progress of the process being performed by the application in the embedded window. When a certain event occurs, the window could be removed from the background and brought to the front. For example, the reception of a message by an e-mail reader application may trigger the operating system to move that process window from the background. The designation of the triggering even could be made by the user, or preset by default. However, the operating system would monitor the process rather than the user's interaction with the display in this example.

Another alternative is that the user performs a specific set of keystrokes or other control functions. These control functions notify the operating system that the embedded image needs to be reactivated and brought from the background to an active window. In this example, the operating system would only monitor the user's interaction with the display, not the process that is running under the embedded window.

However, it is believed that a combination of the two, is more preferable. While the other options are sufficient, and may be desirable within certain operation constraints, it is believed that a combination of both triggering events and user intervention is preferable. In this example, the embedded window moves to an active window if either the user selects that action, or if an event occurs in the underlying process that activates it.

Another key aspect of the invention is that the process underlying the embedded window continues to operate, as is inherent in the description of triggering above. The user may select to have the embedded image updated at given intervals or after occurrence of events. For example, instead of the triggering event of a received e-mail message causing the window to go active, the triggering event may just result in an update of the embedded image.

Alternatively, or additionally, the user may specify that the background images update periodically, regardless of the presence of a triggering event. Since only the portions of the background image that are embedded windows need to be updated, this would not necessarily be processing intensive. In this manner, the user can decide to reactivate the window or not.

One example is again the e-mail application receiving an e-mail message. The embedded window updates either periodically or with the triggering event. Instead of there just being a notification of a received message, the user would see not only that a new message has been received but also a preview of the message itself, or at least the sender. This is due to the fact that the embedded window is not an icon, but an actual view of the underlying application. The user could then decide whether the e-mail application underlying the process window gets activated or not, based upon the additional information made available to the user.

Another option, for users with several embedded windows, lies in the user's ability to prioritize or designate triggering events and update intervals for each embedded window. For example, a user may have an e-mail application running in one embedded window, and a compiler function running in another embedded window. There may be a triggering event for the e-mail application, and none for the compiler application. The e-mail window may be set to update on a triggering event or on a timer. The compiler window may be set up to update on a completely different triggering event or on a different timer.

Figure 3:
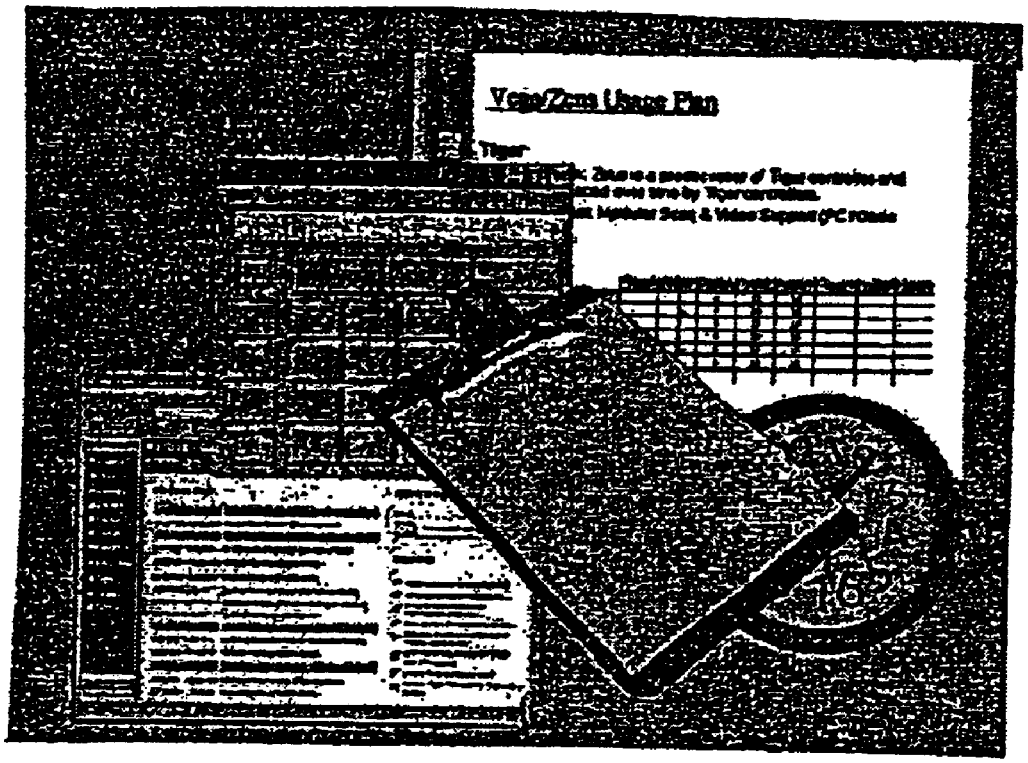
FIG. 3 shows on example of a display image created using the methods of the invention.

One example of a display with an embedded process window can be seen in FIG. 3. In this example, all of the images except for the notepad to the forefront of the image are embedded windows. As can be seen, the information conveyed by these images is considerably superior to that communicated by an icon or button.

One further option for updating the images of process windows is that a ghost image could be used. For example, when a new e-mail message is received by the e-mail application, the embedded e-mail process window in the lower left could become a ghost image that moved in front of the notepad. Since it is a ghost image, it will not completely block the user's work on the notepad, but will allow the user to both see that e-mail has been received, and possibly see the contents of the new message.

Thus, although there has been described to this point a particular embodiment for a method and structure for creating a graphical user interface with embedded windows, it is not intended that such specific references be considered as limitations upon the scope of this invention except in-so-far as set forth in the following claims.

What is claimed is:

1. A method for creating a graphical user interface for a user, the method comprising:

sizing and locating a process window on a two-dimensional display, wherein sizing is performed by the user and a selected size and location becomes a default for all process windows created by a particular application;

creating a graphical representation of the process window;

associating information with the process window;

embedding the process window into a background image of the two-dimensional display, creating an embedded process window;

monitoring activity with regards to the process window, wherein the activity will indicate that the embedded process window is to become an active window.

2. The method as claimed in claim 1, wherein sizing is performed by the user on an embedded process window that overrides the default for that process window.

3. The method as claimed in claim 1, wherein the graphical representation is a bitmap.

4. The method as claimed in claim 1, wherein the information further comprises an application that created the process window, a file being operated on by the application and status of the process.

5. The method as claimed in claim 1, wherein monitoring further comprises activating the embedded process window upon a triggering event.

6. The method as claimed in claim 1, wherein monitoring further comprises activating the embedded process window upon a user action.

7. The method as claimed in claim 1, wherein monitoring further comprises updating the embedded process window upon occurrence of a triggering step.

8. The method as claimed in claim 1, wherein monitoring further comprises updating the embedded process window at a periodic interval.

* * * * *